United States Patent Office 3,331,081
Patented July 11, 1967

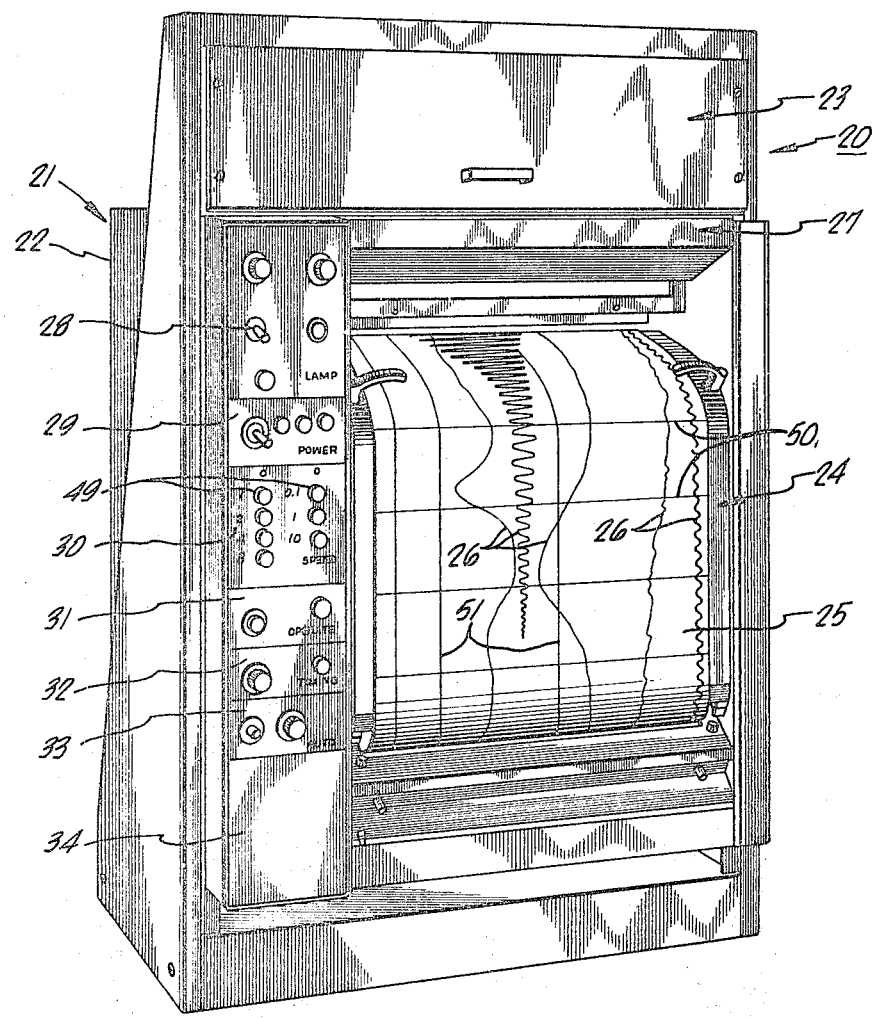

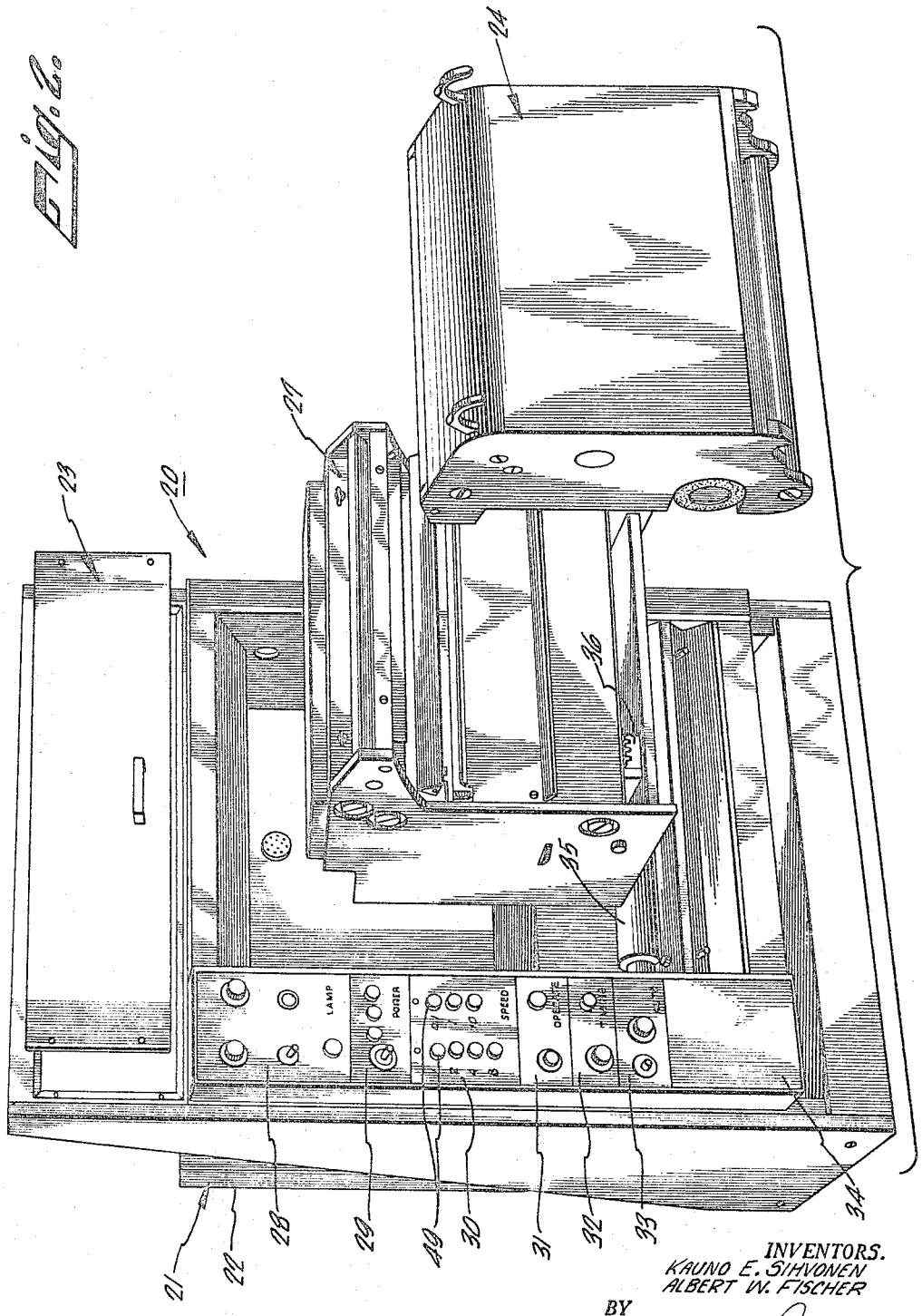

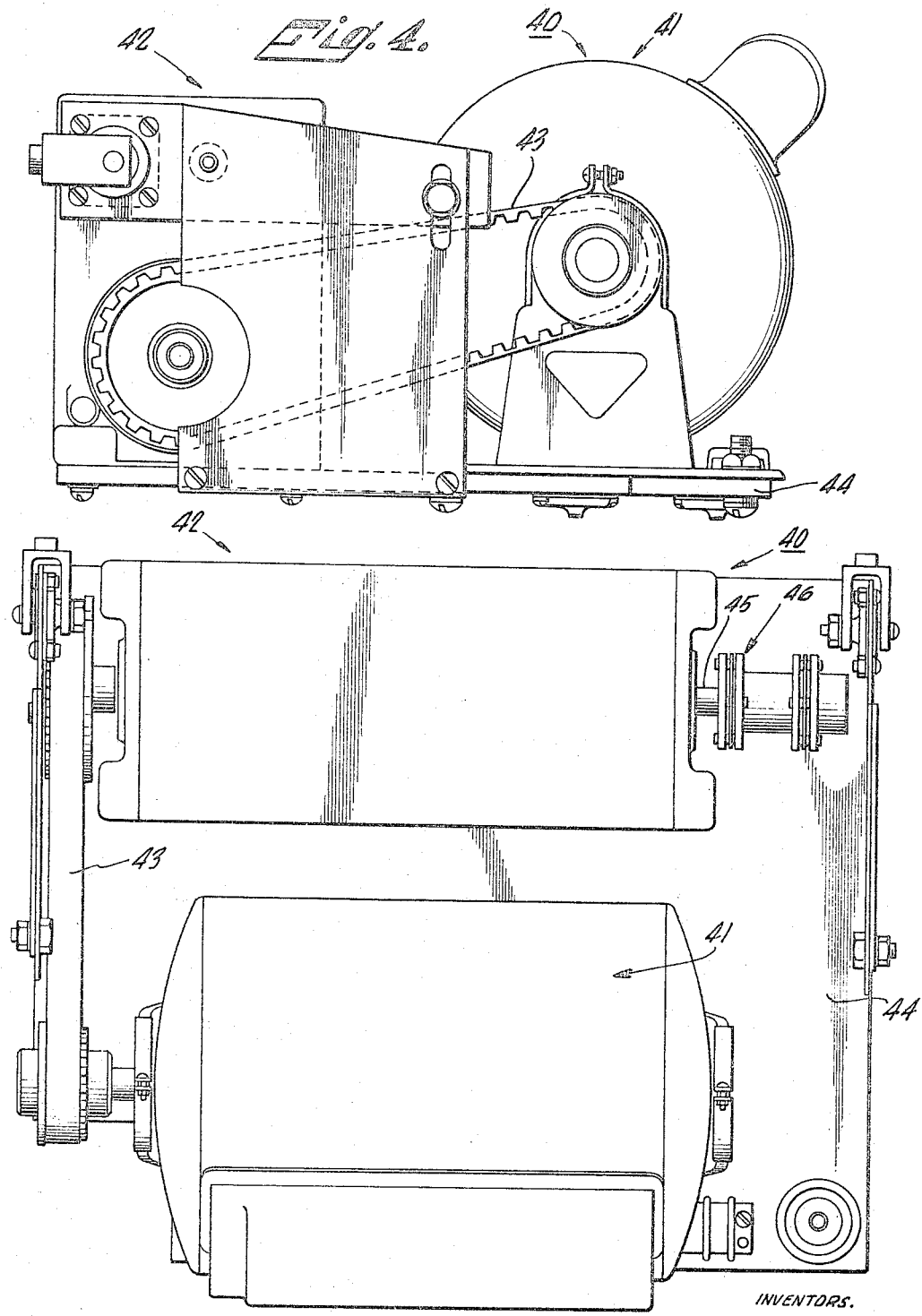

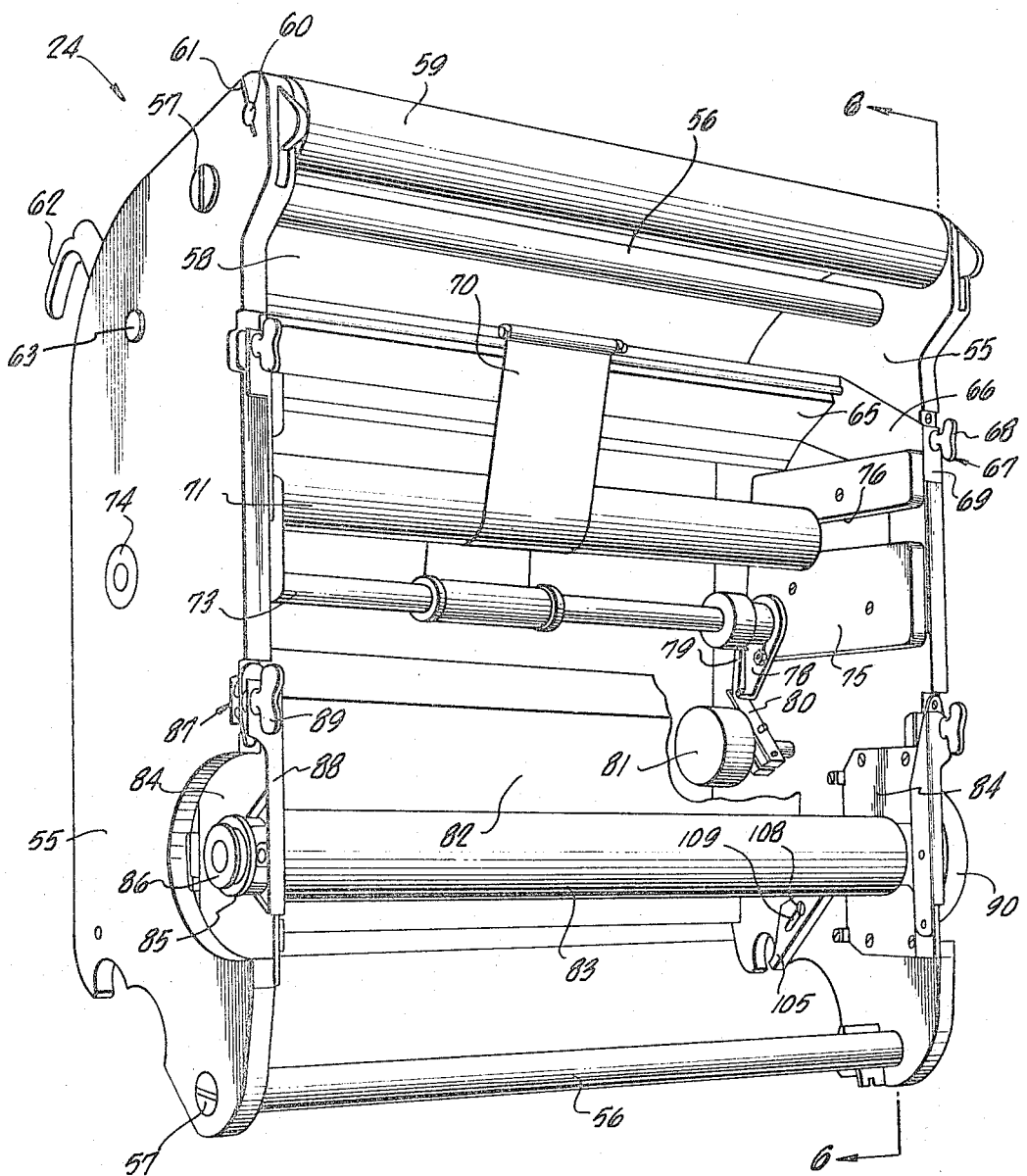

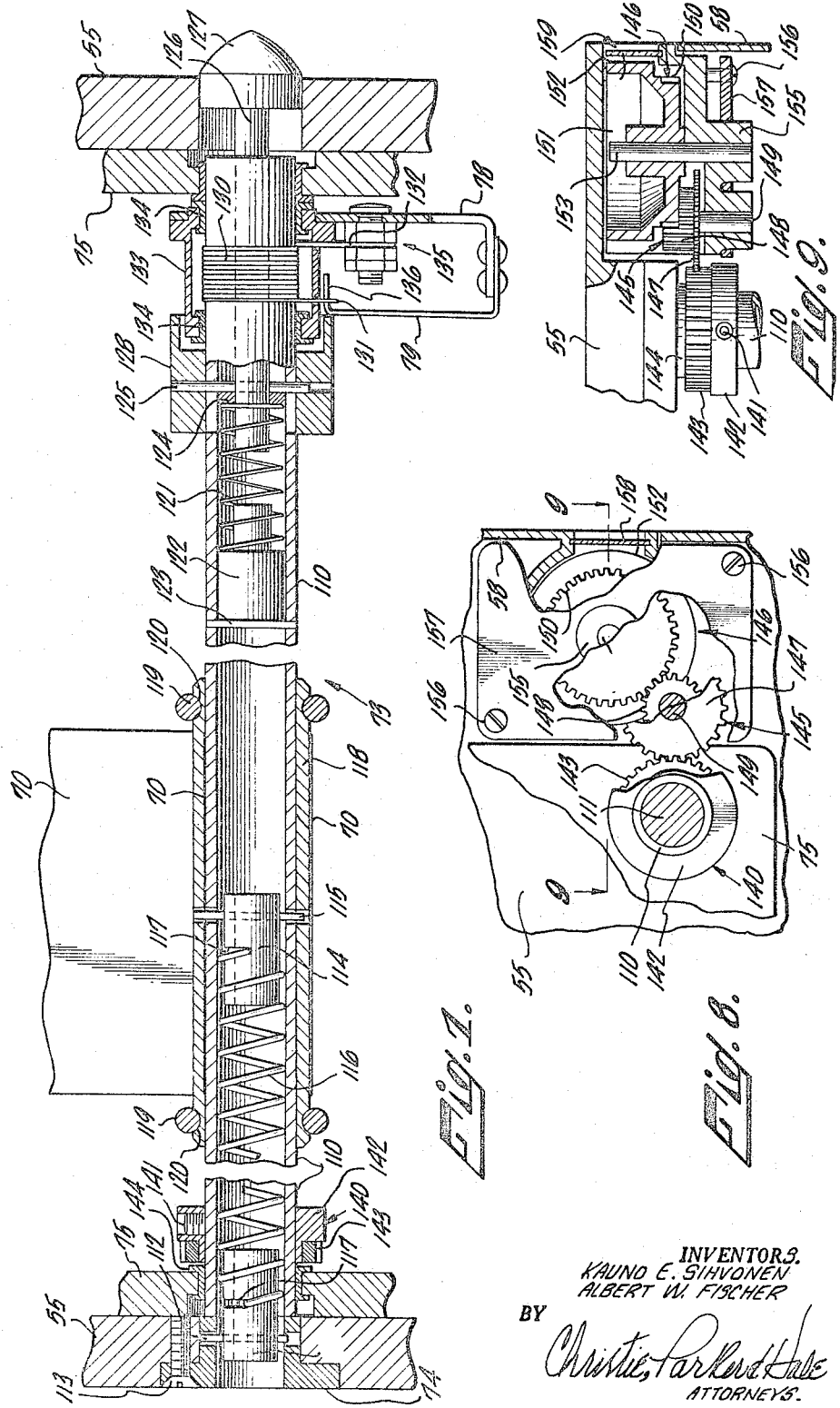

3,331,081
TRANSPORT MODULE FOR MODULAR
OSCILLOGRAPH
Kauno E. Sihvonen, Arcadia, and Albert W. Fischer, La Jolla, Calif., assignors to Consolidated Electrodynamics Corporation, Pasadena, Calif., a corporation of California
Original application Sept. 20, 1960, Ser. No. 57,289, now Patent No. 3,186,000, dated May 25, 1965. Divided and this application May 17, 1965, Ser. No. 456,409
9 Claims. (Cl. 346—136)

This application is a division of application Ser. No. 57,289, filed Sept. 20, 1960, for Modular Oscillograph, issued May 25, 1965, as United States Letters Patent 3,186,000. This application is directed to the record transport module disclosed in said application, and to the apparatus with which the transport module closely cooperates. Patent 3,186,000 presents a more exhaustive description of the oscillograph than is here presented, and the patent is therefore referred to as a supplement to the following description and explanation of the invention.

This invention relates to oscillography, and, more particularly, to an improved transport module for an oscillograph whose components are modularized.

An oscillograph, that is, an apparatus for producing a graphic record representing the instantaneous values of a varying electrical quantity as a function of time, is an extremely complex instrument. The oscillograph consists basically of a galvanometer connected to an electric quantity source, and recording means adapted to produce a graphic record in response to the actuation of the galvanometer by the electric quantity. Modern oscillographs utilize a light beam reflected from a galvanometer mirror onto photosensitive recording material to produce the graphic record of the electric function, thereby providing a recording system which is inertialess with the exception of the galvanometer. Drive means are provided to move the photosensitive recording material, usually in the form of a roll of paper, past the recording light beam. Various systems for developing the recorded image on the photosensitive paper have been utilized, with the current objective of such developments being to render the image visible as soon as possible after recording. By the use of a roll of photosensitive paper, a method for providing a continuous record of the electric function is provided. Various control circuits conventionally are included in the oscillograph in order to give some versatility to the operation.

The oscillograph is a comparatively expensive device. In order to reduce the cost of such oscillographs, it has been the practice, in the past, to standardize the features offered in a particular apparatus, so as to permit the economy of assembly-line manufacture. However, this practice has resulted in the inclusion of features for which a particular purchaser may have no need. These features are purchased since it is more economical to include them in the apparatus as marketed, than to construct a customized oscillograph for the individual purchaser. Alternatively, a purchaser will often need a number of oscillographs, but will have a need of utilization of the oscillographs such that only a limited number of complex instruments are required, simple instruments ordinarily sufficing. However, the complex instruments may be required at different locations at various times. The purchaser must then either select all of his instruments to include the complex features required only occasionally or must transport a single instrument having these features to the various locations as required and substitute less complex instruments when these features are not required. In either case, the end result is that the purchaser is put to additional expense, both in time and in equipment, in order to meet his oscillographic needs.

According to the present invention, an oscillograph is divided into sub-assemblies which are modularized; that is, self contained, and dimensionally standardized. These sub-assemblies are interchangeable between instruments and enable an oscillograph to be assembled for the particular application required. The modules (i.e., the dimentionally standardized sub-assemblies) include the oscillographic mechanisms themselves and the control circuits. Thus, modules for a drive power source, a recording mechanism, a paper transport mechanism, and galvanometer input connections are included in a housing for the oscillograph. The housing also contains the appropriate control modules which include, for example, a paper transport speed control module, a light recording intensity control module, an on-off control module and an automatic recording length control module. Because of the novel concept of the invention, i.e., modularization of the oscillograph, the individual modules have novel structures themselves.

Generally speaking this invention provides a recording material transport assembly for an oscillograph. The assembly includes a module frame and a material supply roller rotatably connected to said module frame. Tensioning means operable to apply tension to said material supply roller so as to inhibit the unrolling of material from the supply roller are provided. A writing roller is rotatably connected to the module frame. A platen having a material support surface is also secured to the frame, together with a take-up roller rotatably mounted to the frame and means for passing the recording material over the writing roller and the platen surface. Means are provided for selectively feeding the recording material passing over the platen surface to the take-up roller. The assembly also includes selectively operable means for attaching the module frame to an oscillograph frame.

The invention may be more readily understood by referring to the accompanying drawings in which:

FIG. 1 is a perspective view of a modular oscillograph according to the invention;

FIG. 2 is an exploded perspective view of the oscillograph of FIG. 1;

FIG. 3 is a plan view of the drive and transmission module for the oscillograph of FIG. 1;

FIG. 4 is a side elevation of the module of FIG. 3;

FIG. 5 is a rear perspective view of the paper transport module;

FIG. 7 is a view in cross section of the roller spring assembly of the transport module;

FIG. 8 is a side elevation partially in section of a paper supply indicator assembly;

FIG. 9 is a plan view partially in section of the paper supply indicator assembly taken along lines 9—9 of FIG. 8.

Figure 6:
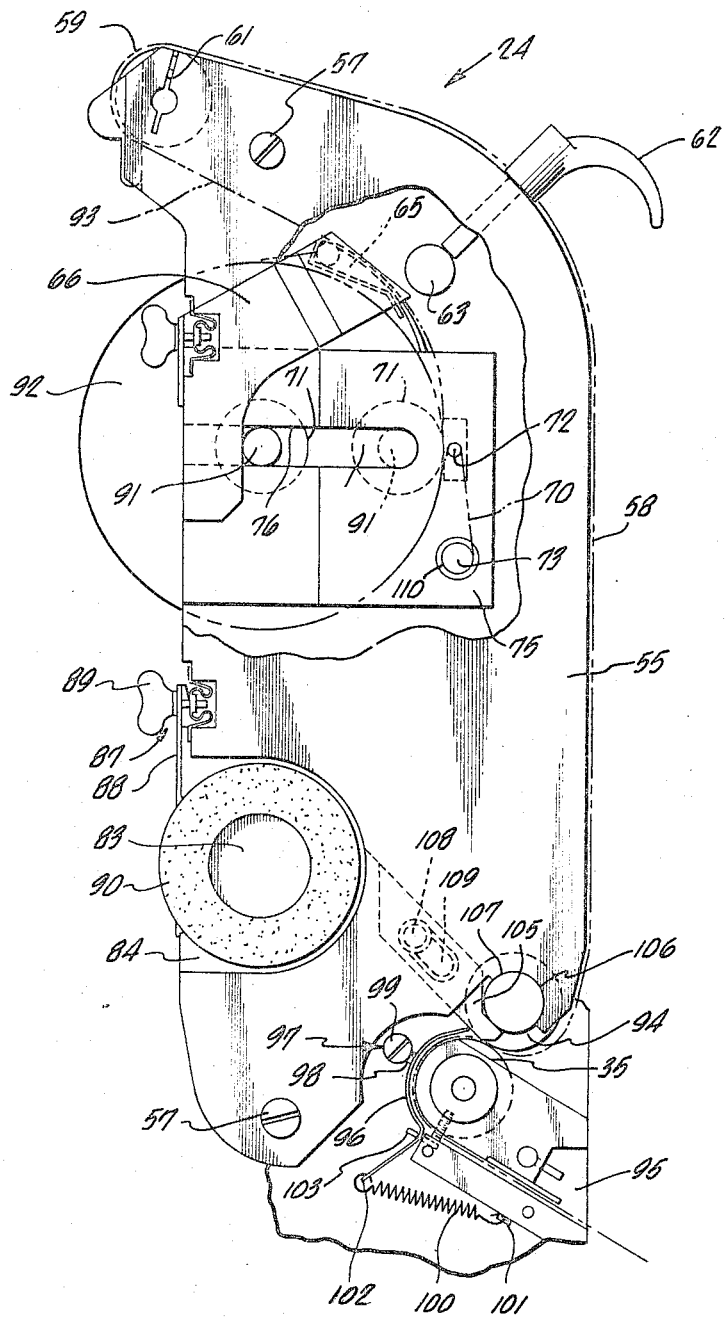
FIG. 6 is a side elevation of a transport module of FIG. 5.

Referring now to FIG. 1 there is shown a view in perspective of a modular oscillograph 20 according to the invention. The modular oscillograph has a housing 21 which holds a chassis 22 mounting various modules of the oscillograph. An input module 23 contains input connections to which are connected the various electric functions to be recorded. A paper transport module 24 has recording paper 25 being transported across the open side thereof. The paper has thereon various graphic representations 26 of varying electric functions. An optical module 27, only a portion of which is visible in FIG. 1, is contained within the chassis behind the paper transport module. Various control modules including a recording intensity module 28, a power on-off module 29, a paper transmission speed module 30, an operate-standby module 31, a timing control module 32, and an automatic record length module 33, are included. A blank section 34 permits the inclusion of additional control modules as may be required. A drive transmission module is included in the oscillograph, but being mounted in the rear portion of the oscillograph is not visible in FIG. 1.

FIG. 2 is an exploded view of modular oscillograph 20 showing input module 23, paper transport module 24, and optical module 27 separated from the chassis of the oscillograph. The control modules 28–33 remain in the positions shown in FIG. 1. A drive roller 35 in the chassis 22 is is utilized in connection with an idler or metering roller 94 (see FIG. 6) to provide the tension required to unwind the recording paper from the paper roll (not shown) contained within the paper transport module. Optical module 27 contains a bank of galvanometers (not shown) to which are connected the electric functions to be recorded. Connecting wires (not shown) extend from input module 23 to galvanometer assembly blocks 36 to make a direct connection between each input and the associated galvanometer. An optical module power connector 37 in the chassis 22 connects to an optical module connector (not shown) of the optical module.

FIGS. 3 and 4 depict a drive and transmission module 40. The drive and transmission module consists of a motor 41 and a transmission assembly 42 connected together by means of a drive belt 43. The motor 41 and transmission 42 are each mounted on a base plate 44 which serves as the base of the module. The motor may be, for example, any conventional electric motor. However, the transmission assembly is preferably the novel transmission assembly shown in FIGS. 5 and 6 of Patent 3,186,000 and described therein. The transmission assembly has an output drive shaft 45 connected to a coupling 46 of a main drive gear assembly 48 (see FIG. 10). The transmission assembly is so constructed that it provides several output speeds of shaft 45 for a constant speed input to the transmission assembly from motor 41. The desired speed of rotation of the output shaft is selected and controlled by depression of suitable combinations of buttons 49 in transmission speed control module 30.

Optical module 27 is mounted to chassis 22 so that it cooperates with the transport module in the manner hereinafter described. The optical module is described and claimed in Patent 3,186,000, of which the present application is a division. As shown in the above-cited patent, the optical module includes a light source and a plurality of galvanometer blocks 36, each of which includes several galvanometers. Each galvanometer includes a mirror as a part of its movement. Light is directed along a predetermined path in the optical module from the light source to the mirrors, and the light reflected from the mirrors emerges from the optical module so as to be focused upon recording paper 25 which moves past the optical module as the transport module is operated. Accordingly, graphic representations or traces 26 are recorded on the paper and extend generally along the length of the paper.

As described in Patent 3,186,000, the optical module also includes mechanisms by which abscissa lines 50 (see FIG. 1) extending transversely of paper 25, and ordinate lines 51 extending along the paper, are recorded on the paper.

Referring now to FIG. 5, there is shown a rear perspective of paper transport module 24. The transport module includes a pair of sides 55, which are held apart by a pair of spacer rods 56. The spacer rods are attached to the sides by bolts 57. The transport module has a platen 58 which extends from the top along the outer side of the module. A writing roller 59 extends between sides 55 and is held in position by means of a roller axle 60, which extends through slots 61 in the transport module sides. A pair of locking handles 62 (only one of which is shown in FIG. 5) are utilized to lock the transport module into the oscillograph frame. The locking handles selectively extend and retract spring-loaded lugs 63 by camming surfaces (not shown). The lugs cooperate with suitable recesses provided at proper locations of the oscillograph frame to locate the transport module in exactly the right position relative to optical module 27. When the transport module is properly positioned in the frame relative to the optical module, the light beams emerging from the optical module which generate information traces 26 are focused on the surface of roller 59, i.e., on the paper passing the roller at the roller.

A paper control assembly 65 is held in position between sides 55 by means of a pair of attaching arms 66, which extend into an attaching clamp assembly 67 having a clamp 68, which selectively locks a cover 69 between the sides, to which it is pivotally connected. The paper control assembly has a windup tape 70 attached thereto. The windup tape extends around a paper supply roller 71 and, after passing over a tensioning bar 72 (see FIG. 6), is attached to a tape windup assembly 73. The tape windup assembly is utilized to apply tension to paper held on the paper supply roller during operation of the oscillograph so as to prevent the paper from unrolling excessively, i.e., overrunning when the machine is stopped. A plug 74 holds the takeup assembly in position. The paper supply roller is connected to the sides by means of a pair of bifurcated holders 75. The supply roller is free to move laterally along a bifurcation 76 in each of the holders. However, the windup tape applies tension to the supply roller so as to urge the supply roller towards the closed ends of the bifurcations.

An actuating arm 78 and a release arm 79 are attached to tape windup assembly 73, and their functions will be more fully described with respect to FIG. 6. The actuating arm rides against a solenoid arm 80 of a rotary solenoid 81. A cover 82 encloses an electrical supply circuit (not shown) of conventional design for the solenoid. A take-up roller 83 is attached to sides 55 by means of attaching plates 84 which have slots therein adapted to engage take-up roller bearing assemblies 85 which are mounted on a roller axle 86. The take-up roller bearing assemblies are held in position by a pair of take-up roller clamps 87, which consist of clamping arms 88 and rotary clamps 89 of conventional type. Each clamp 89 connects the attaching arm 88 associated therewith to a respective side 55. A magnetic clutch shoe 90 is attached to one end of the take-up roller.

Referring now to FIG. 6, there is shown a side elevation of the transport module 24, taken along line 6—6 of FIG. 5. The view of FIG. 6 is partially broken away in order to more clearly illustrate the paper supply roller and associated structure. The paper supply roller 71 is illustrated in both its loaded and its unloaded position. The unloaded position of the paper supply roller is illustrated by the dotted lead line, and the loaded position of the paper supply roller is illustrated by the solid lead line. A roller axle 91, which extends into the bifurcations 76 of the holders 75, is clearly shown both in the loaded and in the unloaded positions. It will be seen that the paper supply roller is free to move in the direction of the platen 58 as paper 92, contained on the supply roller, is unrolled. The path of the unrolled paper is shown by a dotted line 93, which indicates the path of paper transport through the transport module, over the paper guide assembly 65, shown in dotted lines as behind the attaching plate 66, around the writing roller 59, and over the platen surface 58. At the lower end of the platen, the paper passes onto a metering roller 94, and between the metering roller and drive roller 35 which is rotatably mounted in the oscillograph chassis and is driven at a regulated rate. The metering roller 94 is also rotatably mounted in the oscillograph chassis. The drive roller rides against the metering roller 94 so that it rotates in response to rotation of the drive roller. Thus, the rotational rate of the two rollers 94 and 35 is the same, and they provide traction to pull the paper from the paper supply roller 71 along the path just described.

As the paper issues from the junction of the two rollers 94 and 35, it may either pass out of the oscillograph by continuing to contact the drive roller and issue from a paper outlet 95, or may be directed to the take-up roller. A paper guide 96, adjacent the drive roller 35, insures that the paper will follow the path around the drive roller and pass out outlet 95, when it is desired to view the paper directly. When it is desired to feed the paper to take-up roller 83, the paper guide is moved away from the drive roller by rotating a paper guide set cam 97 one hundred and eighty degrees from the position shown by turning screw 99. It will be seen that a portion 98, of the paper guide set cam, is recessed so that a maximum movement of the paper guide away from the drive roller is provided when cam 97 is rotated one hundred and eighty degrees from the position shown in FIG. 6. The paper guide is urged away from drive roller 35 by means of a spring 100 attached by an attaching lug 101 at one end, and to the paper guide at an arm 102 thereof at the other end. The paper guide is attached to the frame at a pivot 103 so as to be free to move either toward or away from the drive roller in response to the urging of spring 100 and movement of the set cam 97.

The metering roller 94 is attached to the frame of the oscillograph. When it is desired to completely remove paper transport module 24 from the frame, a slide lock 105, which contacts a bearing surface 106 of the metering roller 94 so as to hold the bearing surface in an arcuate indentation 107 in the side of the transport module, is loosened. Dotted lines indicate a set screw 108 which is inserted in a slot 109 in arm 105 so as to enable the arm to be selectively fixed in the position shown, and to be loosened to permit the transport module to be removed from the roller 94 by moving the arm away from indentation 107. Arms 105 and lugs 63 cooperate to releasably secure the transport module in its proper position in the oscillograph chassis.

FIG. 7 shows a cross sectional view of the roller spring assembly 73, the primary element of which is a tube 110. The plug 74 has positioned therewithin a spring holder 111 through which a pin 112 extends, so as to fix the spring holder in position angularly and axially of the plug. An attaching screw 113 extends through the plug 74 and into a threaded aperture in transport side 55. A second spring holder 114 is positioned in the central part of tube 110 and is angularly and axially secured relative thereto by means of a pin 115 which extends through apertures in the tube and the second spring holder. A torsion spring 116 extends between the two spring holders and is held by slots 117 in each spring holder.

About the portion of tube 110 in which second spring holder 114 is positioned, a take-up tape holder 118 is held by a pair of O-rings 119, positioned in indentations 120 in holder 118. Take-up tape 70 extends around the lower outer surface of holder 118 and then is inserted through a straight slot (not shown) extending partially axially therein so as to be in contact with the inner upper surface of the holder and tube 110. Pin 115 extends through the take-up tape and holder 118 so as to hold the tape and the holder fixed with respect to tube 110.

A compression release spring 121 is held in position by a release spring holding block 122 which rides against a pin 123 extending through tube 110. At its opposite end, spring 121 abuts a washer 124 which rides against a clutch pin 125. The clutch pin extends through an aperture in a releasing clutch actuating rod 126, the rod terminating in a head 127. A clutch housing 128 is also held in position about tube 110 by means of clutch pin 125.

A drag torsion spring 130 is wrapped around tube 110 so as to be frictionally engaged therewith. Spring 130 has two ends 131 and 132, which extend through apertures in a spring housing 133 enclosing the spring. Housing 133 is connected to tube 110 by means of a pair of dual flange bearings 134. Drag torsion spring end 132 is clamped to solenoid actuated arm 78 by means of a nut and bolt combination 135. Drag torsion spring end 131 extends through housing 133 and contacts the clutch assembly housing 128 and the extension arm 79. With clutch assembly housing 128 in the position shown, a camming surface 136 of the clutch assembly housing forces spring end 131 into an unwound position, so as to release the traction with which spring 130 frictionally engages tube 110. When head 127 is pushed in, so as to be flush with the surface of the side 55, camming surface 136 is forced away from spring end 131 by the resilient bias in extension arm 79, allowing spring 130 to exert traction on tube 110. In this position, with spring 130 exerting traction against the tube, if solenoid actuated arm 78 is rotated counterclockwise, the tube will also be rotated counterclockwise. Insertion of module 24 into the oscillograph frame positions head 127 flush with side 55 so as to cause spring 130 to exert traction on tube 110.

During the operation of transport module 24, spring 116 exerts a counterclockwise torque (reference being had to FIG. 5 regarding clockwise and counterclockwise directions) on the take-up tape 70, thus pulling the tape tightly against the paper supply roll 92. During operation, paper is normally being pulled off of the roll at a high rate, for example, twenty inches per second. If the machine is deactuated, a certain amount of continued running off of the paper results, due to the inertia of the paper roll itself. Thus, it is necessary to apply an additional stopping torque to the paper roll. This stopping torque is applied by rotating tube 110 counterclockwise to cause tape 70 to exert additional drag on the paper roll. Solenoid 81 is actuated so that solenoid arm 80 moves solenoid actuated arm 78 counterclockwise. This counterclockwise movement causes an angular displacement of tube 110, thus exerting an additional tightening effect on the paper roll by means of take-up tape 70.

Adjacent plug 74, a record supply gear assembly 140 is attached to tube 110 by means of a set screw 141 which extends through an attaching flange 142 of the gear assembly. The gear assembly includes a gear 143. A bearing 144 provides for easy rotation of holders 75.

Referring now to FIGS. 8 and 9, the record supply mechanism is illustrated as consisting of record supply gear assembly 140, an intermediate gear assembly 145, and a drive gear assembly 146. The intermediate gear assembly 145 includes a large intermediate gear 147 and a small intermediate gear 148 attached together and mounted on an axle 149. Drive gear assembly 146 includes a gear 150 and an indicator wheel 151 having record supply indicia impressed in a peripheral indicia surface 152 thereof. The record supply and gear assembly is mounted on an axle 153. Axles 149 and 153 extend through a record supply mounting assembly 155. The record supply mounting assembly is held in position by means of a pair of bolts 156 which extend through a cover plate 157 and the record supply mounting assembly engages the transport module side 55. A transparent window 158 is attached to the record supply mounting assembly so as to permit the viewing of the indicia surface through the window and an aperture 159 in platen 58.

Indicia surface 152 is rotated to correspond to rotation of tube 110 by the interengagement of gears 143 and 147 and 148 and 150. As has been previously pointed out, tube 110 rotates to apply tension to paper supply 92 by means of tape 70. Thus, when the paper supply is at a maximum, tube 110 is disposed in a maximum counterclockwise rotation. As the paper supply diminishes, the tube (as viewed in FIGS. 6 and 8) rotates clockwise in continuing to apply tension to the tape. This clockwise rotation is utilized to indicate the amount of paper remaining in the record supply. The exact gear ratios may be adjusted with respect to the thickness of the record material utilized in order to render absolutely accurate the indication of record length. However, in actual practice, rough approximation may be sufficiently accurate, so that a preselected gear ratio may be utilized generally for a wide variety of types of recording paper. Alternatively, wheels containing indicia appropriate for different types of papers may be utilized for indicia surface 152. Thus, the same amount of rotation will indicate differing amounts of paper supply for different wheels.

Figure 10:
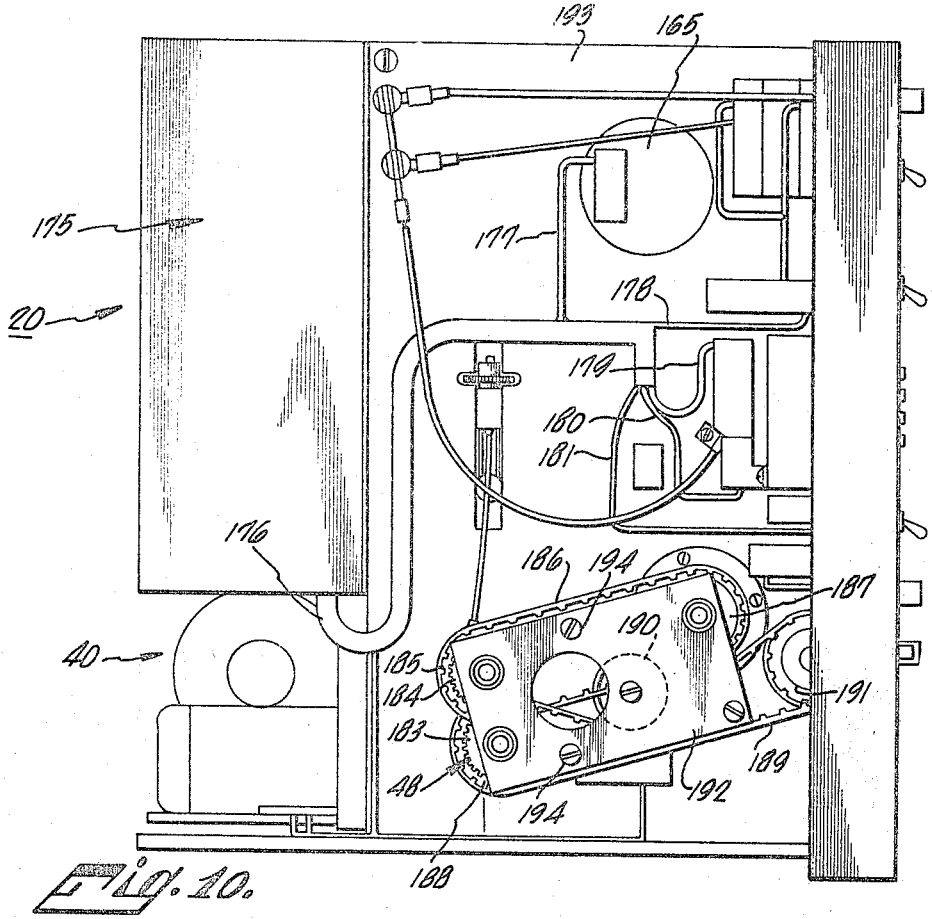
FIG. 10 is a side elevation of the modular oscillograph.

FIG. 10 is a side elevation of a modular oscillograph according to the invention. An electrical power supply module 175, which is of conventional construction and is designated as appropriate for the particular oscillographic operations to be performed, is connected to the oscillograph frame. An electrical power and control cable 176 extends from the electrical power module and has branches 177, 178, 179, 180, and 181, which are connected to the various modules and control circuits on the front panel assembly. Visible in FIG. 10 is an event numbering assembly 165 described in Patent 3,186,000 of which this application is a division and described and claimed in application Ser. No. 456,408, filed May 17, 1965, which is a division of Patent 3,186,000.

Also visible in FIG. 10 is the drive module 40. The transmission output shaft 45 is connected to a coupling 46 (see FIG. 3) to which a main drive gear assembly 48 is connected. The main drive gear assembly includes a tooth gear 183 which engages a tooth gear 184 attached to a take-up roller transfer pulley 185. A drive belt 186 extends between transfer pulley 185 and a take-up roller drive pulley 187. The drive pulley is attached to a magnetic clutch (not shown) which abuts the magnetic clutch 90 (see FIG. 6) of transport module take-up roller 83. The main drive gear assembly includes a metering roller drive transfer pulley 188 which engages a belt 189. Belt 189 passes on one side about an idler roller 190 and engages a metering roller drive pulley 191 which is attached to metering roller axle 106 (see FIG. 6). The pulleys 185, 187, 188 and 191, and idler roller 190 are held in position by a positioning plate 192 through which the gear axles extend. The positioning plate is fixed to chassis side plate 193 by a pair of bolts 194.

What is claimed is:
1. In an oscillograph comprising a chassis, deflectable means for producing on a quantity of recording material moving along a predetermined path in the oscillograph a trace of the variations of an oscillograph input signal relative to a reference value of the signal, and means mounted to the chassis for moving a strip of the recording material through the oscillograph, the improvement comprising a recording material transport including a transport frame, a recording material supply roller rotatably mounted to the frame, tensioning means mounted to the frame operable to apply tension to recording material on the supply roller to inhibit the unrolling of recording material therefrom, a writing roller rotatably mounted to the frame, a platen attached to the frame and having a recording material support surface, a take-up roller attached to the frame, said strip moving means including a driven friction member coupled to the take-up roller for rotation therewith and a drive friction member mounted to the chassis, means for passing a strip of recording material from the supply roller over the writing roller and platen surface along said path, and means selectively operable to releasably attach the transport frame to the oscillograph chassis so that the driven friction member is automatically engaged with the drive friction member and said predetermined path is placed in a predetermined operative relation to the deflectable means.

2. Apparatus according to claim 1 including selectively operable means disposable in either one of two states for directing recording material passing from the platen surface to the take-up roller in one state thereof and for directing recording material passing from the platen surface away from the transport in the other state thereof.

3. Apparatus according to claim 2 wherein the selectively operable means for directing recording medium either to the take-up roller or away from the transport is mounted to the oscillograph chassis at such a location that said means is disposed between the platen and the take-up roll when the transport frame is mounted to the chassis.

4. Apparatus according to claim 1 including indicating means in the transport operable in response to unreeling of recording material from the supply roller to present a visible indication through the platen of the quantity of recording material remaining upon the supply roller.

5. Apparatus according to claim 4 wherein the tensioning means includes a flexible tape secured at one end to the transport frame and extending around a portion of the support roller to its other end, a tension roller rotatably mounted in the frame and to which the other end of the tape is secured, and means operatively coupled to the tensioning roller for biasing the tensioning roller to rotate to reel in the tape.

6. Apparatus according to claim 5 wherein the indicating means is coupled to the tension roller and is responsive to rotation thereof to provide said indication.

7. Apparatus according to claim 1 wherein the tensioning means includes a tube which rotates to maintain tension on the recording material supply roller as the supply of recording material on the supply roller decreases, a recording material supply indicator, and means connected between the tube and the supply indicator for converting angular movement of the tube to a reading on the indicator.

8. Apparatus according to claim 1 wherein the means for passing the recording material along the predetermined path includes a driven roller rotatably mounted to the oscillograph chassis, an idler roller rotatably mounted to the oscillograph chassis adjacent the driven roller for rotation in response to rotation of the driven roller, recording material passing from the platen between the driven and idler rollers, and a guide element movably mounted to the oscillograph chassis.

9. Apparatus according to claim 8 wherein the means for removably mounting the transport frame to the oscillograph chassis includes means carried by the transport frame for releasable engagement around the idler roller.

References Cited

UNITED STATES PATENTS

| | | | |
|---|---|---|---|
| 1,636,988 | 7/1927 | Cline et al. | 242—75.41 |
| 1,896,802 | 2/1933 | Richter | 242—75.42 |
| 2,113,748 | 4/1938 | Ross et al. | 346—44 |
| 2,805,113 | 9/1957 | Brown et al. | 346—136 X |
| 2,913,299 | 11/1959 | Clift | 346—136 X |
| 3,066,299 | 11/1962 | Kampf | 346—109 |

RICHARD B. WILKINSON, *Primary Examiner.*

J. W. HARTARY, *Assistant Examiner.*